(12) United States Patent
Bilborough et al.

(10) Patent No.: US 6,489,161 B2
(45) Date of Patent: Dec. 3, 2002

(54) PARTITIONED COMPOSTING CAGE

(75) Inventors: Richard Crossley Bilborough, Preston (GB); Kevin Michael Chandler, Lymm (GB); Alan Heyworth, Rossendale (GB); Philip Jewes, Preston (GB)

(73) Assignee: TEG Environmental PLC, Preston (GB)

( * ) Notice: Subject to any disclaimer, the term of this patent is extended or adjusted under 35 U.S.C. 154(b) by 0 days.

(21) Appl. No.: 09/991,886

(22) Filed: Nov. 26, 2001

(65) Prior Publication Data

US 2002/0064868 A1 May 30, 2002

Related U.S. Application Data

(63) Continuation-in-part of application No. PCT/GB00/01975, filed on May 23, 2000.

(51) Int. Cl.⁷ .................................................. C12M 1/00
(52) U.S. Cl. .................................. 435/290.4; 435/290.2
(58) Field of Search ........................... 435/290.1, 290.2, 435/290.4; 366/131, 150.1, 154.1, 155.2

(56) References Cited

U.S. PATENT DOCUMENTS

| | | | | |
|---|---|---|---|---|
| 4,358,540 A | * | 11/1982 | Itoh et al. .................... 422/193 |
| 4,397,674 A | * | 8/1983 | Laughbaum .................. 366/345 |
| 5,434,080 A | * | 7/1995 | Schmutz ..................... 435/290.2 |
| 5,527,373 A | * | 6/1996 | Chareyre .................... 435/290.1 |
| 5,879,931 A | * | 3/1999 | Kim ............................ 366/345 |

FOREIGN PATENT DOCUMENTS

| DE | 19807035 | * | 5/1999 |
|---|---|---|---|
| FR | 2348871 | * | 11/1977 |
| FR | 2473038 | * | 7/1981 |

\* cited by examiner

Primary Examiner—David A. Redding
(74) Attorney, Agent, or Firm—Dennison, Schultz & Dougherty

(57) ABSTRACT

A perforated enclosure for reception of material to be composted is divided into a plurality of compartments. A trough is capable of being raised and lowered;between a low level filling station and the top of this enclosure, and then travelling across the top of this enclosure to dispense the material to be composted into the compartments. The trough base includes a plurality of side by side rotors having circumferential vanes with radial cross walls whereby the material to be composted is distributed to the compartments. An auger may be mounted below the perforated enclosure between respective guide rails and may travel therealong to extract compost from the base of each compartment. The auger is moved intermittently by a co-ordinated system of hydraulic rams which connect to the guide rails by gripper means.

11 Claims, 9 Drawing Sheets

PARTITIONED COMPOSTING CAGE

This application is a continuation-in-part of International Patent Application No. PCT/GB00/01975 filed May 23, 2000.

TECHNICAL FIELD OF THE INVENTION

This invention concerns a composting cage comprising a perforated enclosure divided into a plurality of compartments. It is particularly, but not exclusively suitable for composting biological waste material on an industrial scale, where at least tens of kilograms of such waste are to be loaded per day.

BACKGROUND ART

The process of composting is complex. Aerobic bacteria break down the biological material. Thus the material to be composted must be well aerated, not over compacted. This limits the size of any composting container, specifically the width of same in the industrial scale cage with which the invention is primarily concerned. If it is too large, the material in the centre will not have sufficient oxygen and anaerobic processes will ensue which is undesirable. For the same reason, it is important to have a mixture of fine and coarse material. It is also important for purposes of aeration that the material is loaded by sprinkling it in to the top of the cage.

An even distribution of material within the cage is also very important so that there are no higher (deeper) areas of material where it may tend to compact and also so that an evenly degraded layer of material of relatively constant thickness can be regularly removed from the base of the cage.

Loading of the cage has hitherto been carried out by an elongate trough, extending the full width of the cage, and permanently mounted above the cage so as to slide therealong. The trough is loaded with a suitable mixture of material to be composted from a sloping elevator assembly at one end of the cage, and then slides along the top of the cage to dispense the material to one or more selected compartments.

OBJECTS OF THE INVENTION

One object of the invention is to provide means for unloading of the trough such that the material therein will be scattered or sprinkled and thereby aerated, but will also be spread as evenly as possible.

Another object of the invention is to tackle a problem associated with removal of composted material from the base of the compartment. This is conventionally accomplished by an auger mounted below the perforated enclosure between respective guide rails and capable of travelling therealong whilst also rotating. Hitherto, the auger has been mounted onto the rails by way of respective motorised trolleys at each end. In order to remove composted material evenly, it is important to try and move the respective ends of the auger at the same rate, so that the axis of the auger remains substantially perpendicular to the direction of travel. Hitherto, this has proved difficult.

SUMMARY OF THE INVENTION

According to a first aspect of the invention, the trough has a base formed in part by a plurality of side by side rotors, each having circumferential vanes with radially extending cross walls, whereby the material to be composted can be distributed to the compartments.

In order to prevent material, particularly dry and sandy material, from dropping out between the rotors, the trough preferably has a plurality of flaps mounted below the rotors, these flaps being openable by a lever mechanism upon actuation of the rotors.

Advantageously, a hydraulic lift is provided for raising and lowering the trough between a low level filling station and the top of the cage. At the low level filling station, the trough can be evenly loaded with much greater accuracy, by visual inspection, by means of a conventional mechanical shovel or similar loading equipment.

According to a second aspect of the invention, the auger mounted below the enclosure is now moved intermittently along the respective guide rails by a co-ordinated system of hydraulic rams.

Advantageously, the hydraulic rams, which are arranged at each end of the auger, mounting the auger to the respective guide rails, have a common hydraulic power supply, which links to one of the rams through an axial passage of the auger. In this way the rams will generally move the ends of the auger to the same extent and will not allow them to become significantly out of alignment with each other.

The above mentioned aspects of the invention will all be present in preferred embodiments of composting cage. However, in other embodiments any one of these inventive features may be present on its own, independently of the others.

BRIEF DESCRIPTION OF THE DRAWINGS

The invention will be described further, by way of example, with reference to the accompanying drawings, in which.

DETAILED DESCRIPTION OF PREFERRED EMBODIMENT

The illustrated embodiment of composting cage has both aspects of the invention applied thereto.

Figure 3:
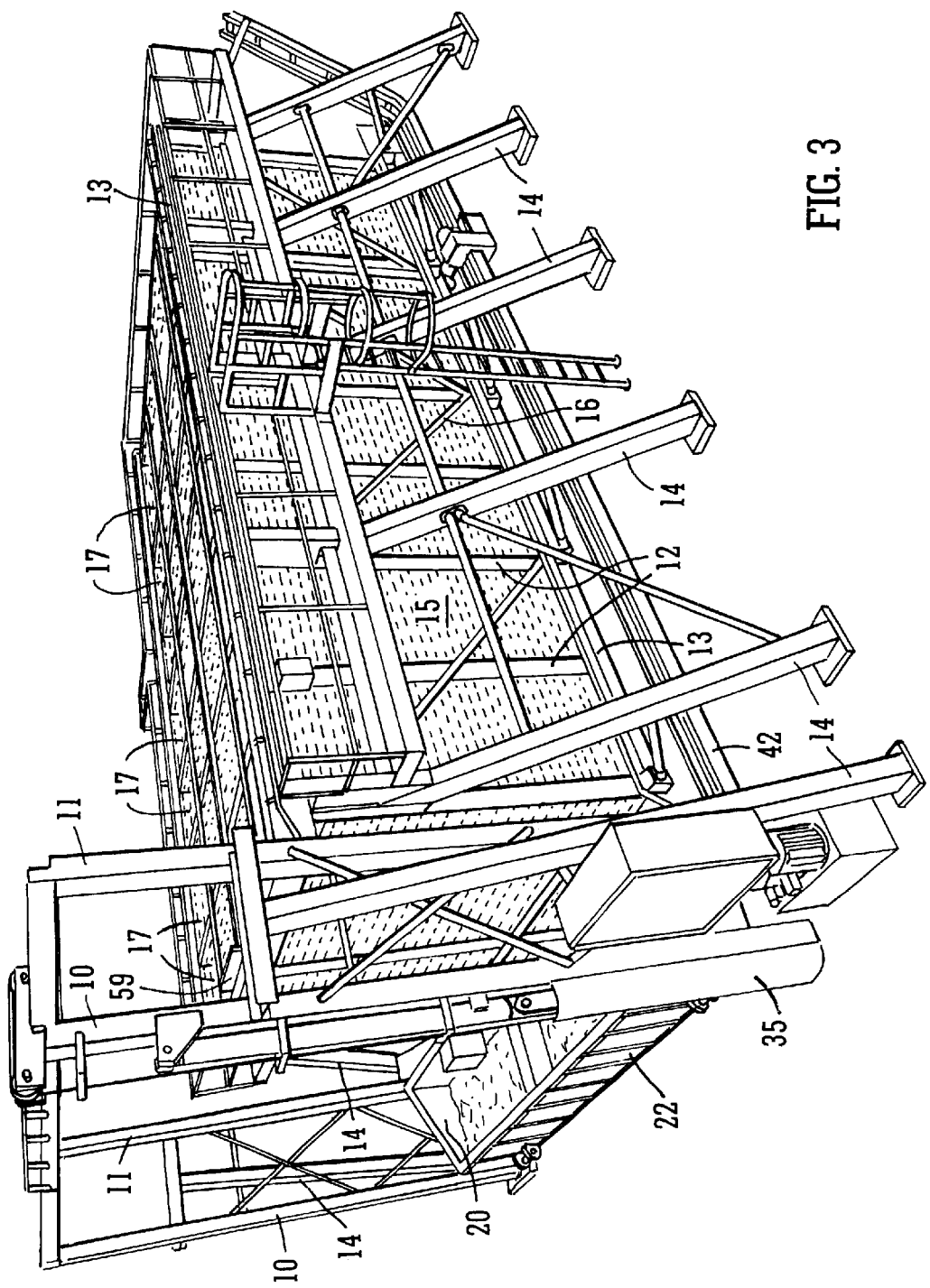
FIG. 3 is a reduced scale, perspective view from the front and above of a similar embodiment of the composting cage of the invention.

As best shown in FIG. 3, the cage comprises a large, rectangular perforated enclosure 15, which maybe of metal or of plastics material, supported by a framework of upright beams 10, 11, 12, etc interconnecting substantially horizontal crosspieces 13, and interconnecting oblique struts 16 as well as supporting stanchions 14. The cage is divided transversely into a plurality of compartments of equal width by respective perforated or mesh partitions 17. In a standard cage there may be eight such compartments. Others may be added in two compartment modules. The cage may be about 12 feet (3.6 m) in height, but the enclosure 15 is supported by the framework 10–16 about 2 ft (0.6 m) above ground level. Thus a gap remains between the bottom of the defined partitioned enclosure 15 and the ground to permit removal of the composted material.

Material to be composted is mixed in appropriate proportions and then fed at intervals, e.g. daily, into the top of the respective compartments of the cage. Composted material is also removed periodically, probably also daily, from the base of the cage so that there is a continuous process in operation.

A trough 20 is provided as part of the composting cage apparatus to feed material into the top of the compartments. The structure of the trough 20 is shown in greater detail in FIGS. 4 to 8. It comprises a front wall 22, a rear wall 24 and respective side walls 26. The rear wall 24 is higher than the front wall 22. The base of the trough 20 is provided by a plurality of substantially parallel rotors 21 which extend transversely of the cage. These rotors 21 carry circumferential manes 23 and cross walls 31, which extend radially therebetween, so that when they rotate loose material in the trough 20 will be carried round in the resulting recesses or pockets and will fall from the base of the trough 20. The position of respective cross walls 31 is staggered between each pair of adjacent circumferential vanes 23. Also, the cross walls 31 extend beyond the circumferential vanes 23 so as to dislodge material from the recesses or pockets of the adjacent rotor or rotors 21 as the latter rotate.

Figure 4:
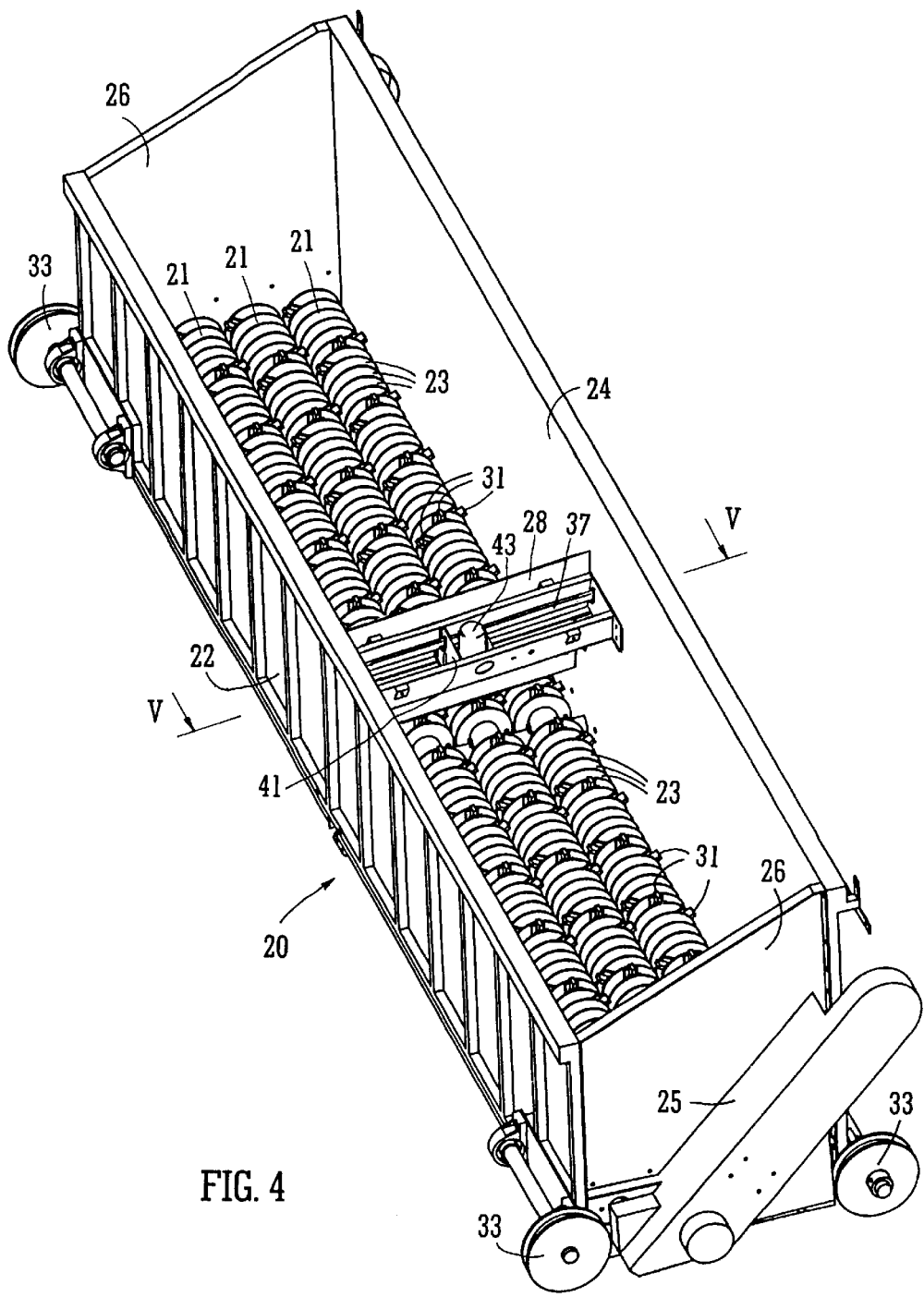
FIG. 4 is an enlarged scale, perspective view, from the front and above of the trough.
Figure 7:
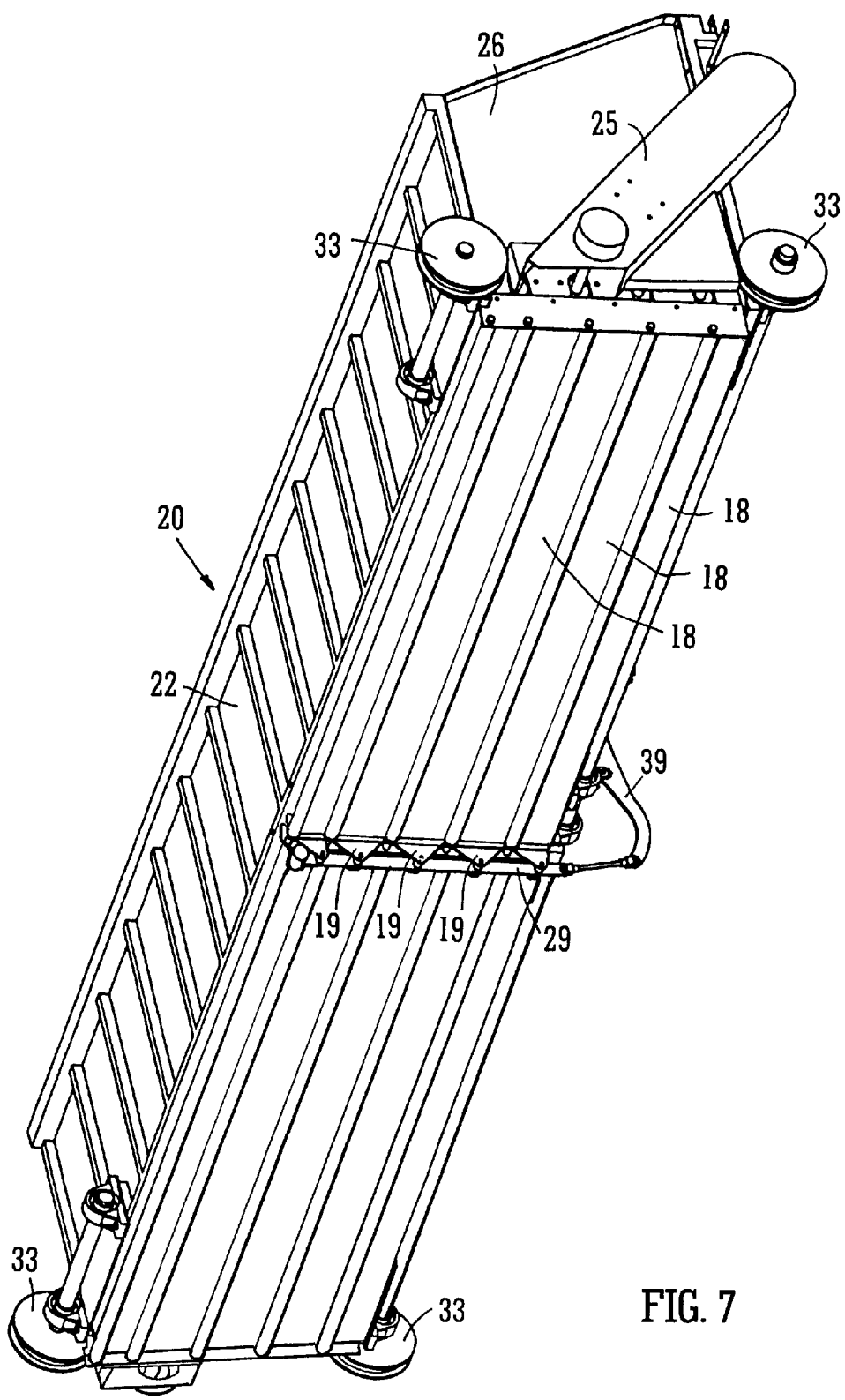
FIG. 7 is a perspective view of the trough of FIG. 4 from below, showing the flaps closed.
Figure 8:
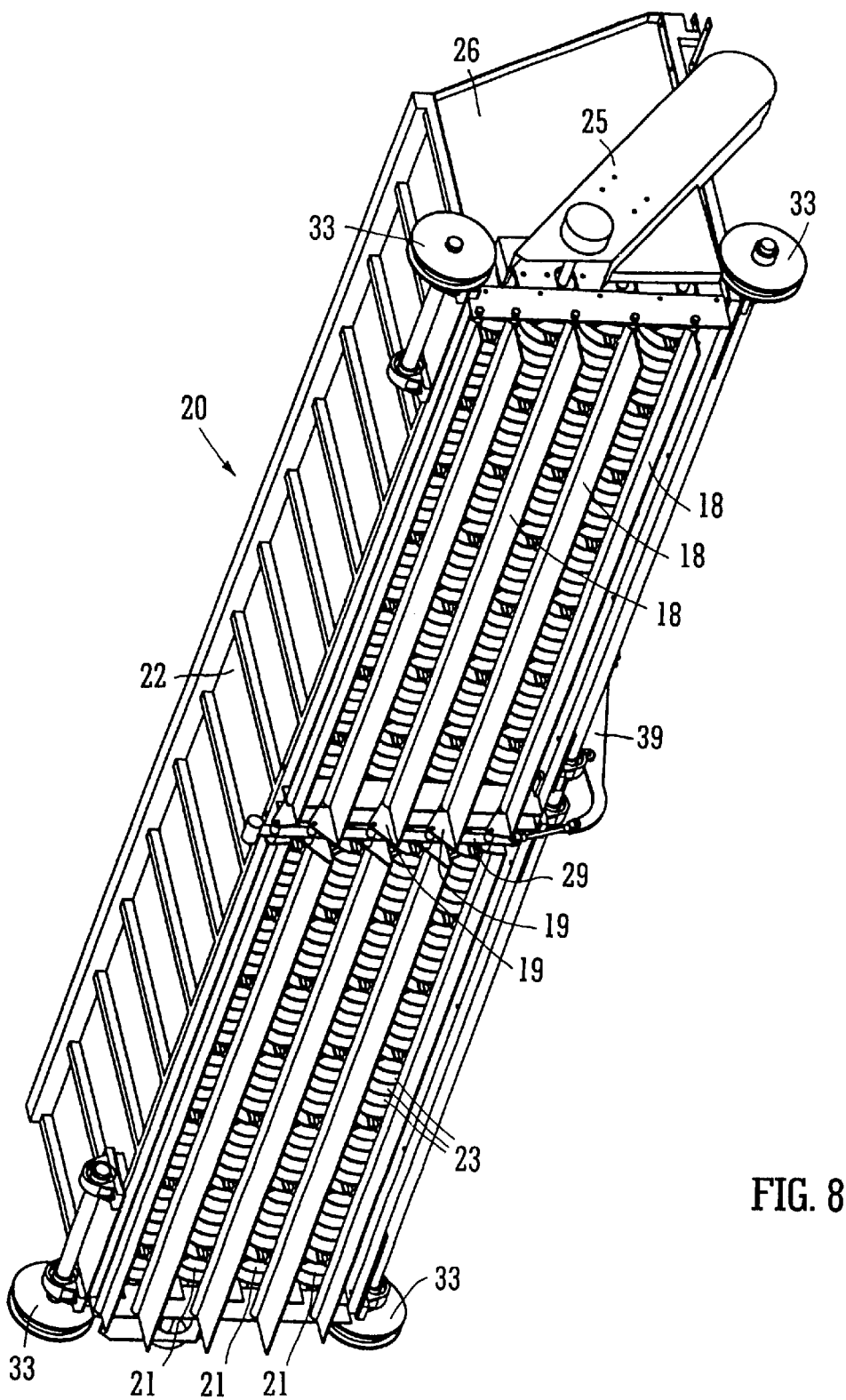
FIG. 8 is the same view from below the trough as in FIG. 5 but showing the flaps open.

To prevent small dry particles falling through between the rotors, which could be a problem in the case of a sandy mixture for composting, a plurality of flaps 18 are disposed below the rotors 21. These flaps 18 are pivotally mounted in the manner of louvres. They are generally arranged in close side-by-side adjacency, in a closed condition (FIG. 7). A partition 28 in the centre of the trough 20, which is shown in FIG. 4, houses a mechanism for opening the flaps 18.

Figure 5:
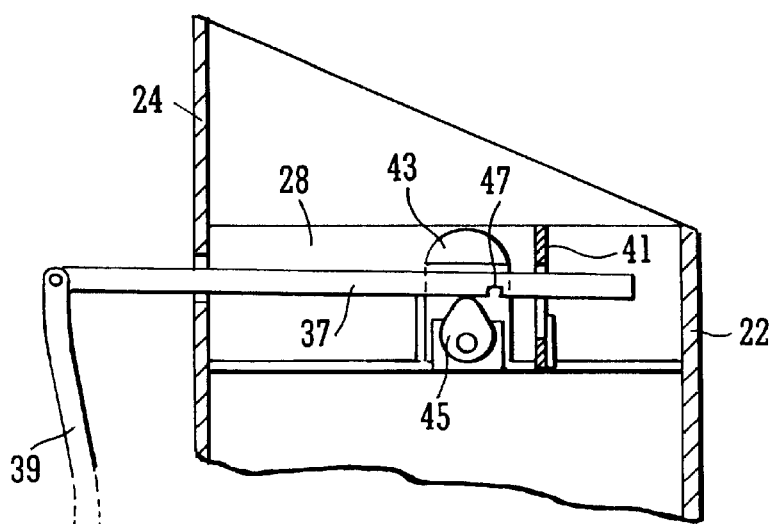
FIG. 5 is an enlarged scale, partial, cross-sectional view of the flap release mechanism, along line V—V in FIG. 4 and in the direction shown by the arrows.
Figure 6:
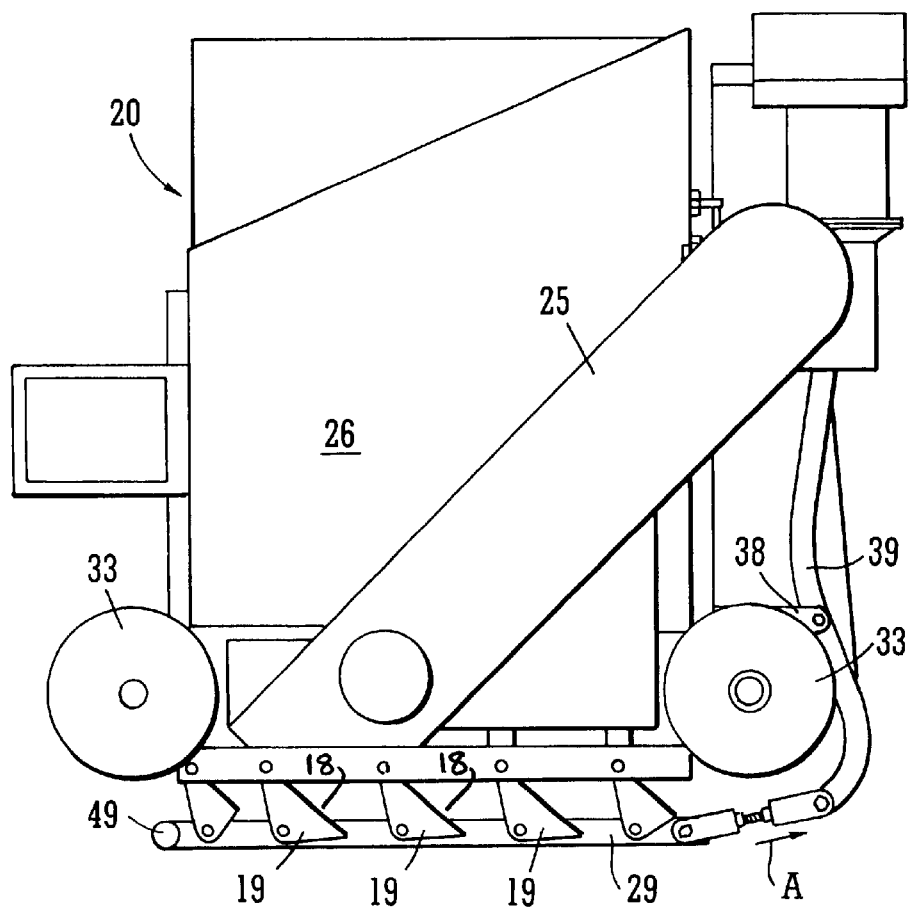
FIG. 6 is an enlarged end view of the trough, corresponding to the end which is visible in FIG. 4.

This mechanism is shown in greater detail in FIG. 5. At the centre of the trough base, each of the flaps 18 carries a downwardly extending lever, in the form of a triangular flange 19, which is connected pivotally to a linkage mechanism 29. The free, rear end of the mechanism 29 serves as a striker 49, whose purpose will be explained later.

The linkage mechanism 29 comprises a number of pivotally connected rigid links, the last of which (39) is of elongate curving form and is pivotally mounted to the front 24 of the trough 20 by means of a rigid strap 38. An upper end of this final link 39 is pivotally connected to a flap latching bar 37, which extends through the middle of the partition 28 and is free at its other end, as best shown in FIG. 5. Inside the partition 28 there is a cross wall 41 which serves as a catching plate for engagement by a notch 47 in the latching bar 37. When the notch 47 is thus engaged, the top end of the final link 39 is kept close to the trough 20 which means that the lower end of this link 39 keeps the rest of the linkage 39 pulled in the direction indicated by arrow A in FIG. 6 so that the flaps 18 are kept closed (FIG. 7). A flap release motor 43 is arranged inside the partition 28 and is operative to drive a rotary eccentric cam 45 which will lift the latching bar 37 out of engagement with the plate 41. As soon as the bar 37 is disengaged, it is pulled in the direction of its connection to the link 39 as the flaps 18 automatically drop open (FIG. 8) to a substantially vertical position under their own weight.

The trough 20 is mounted on four wheels 33, one at the front and rear of the bottom of each side wall 26. Also attached externally to the side walls 26, behind chainguard covers 25, are motors and chain drives for actuation of the rotors 21 in the base of the trough 20. Motors (not shown) for driving the aforesaid wheels 33 are mounted on the rear wall 24.

Figure 1:
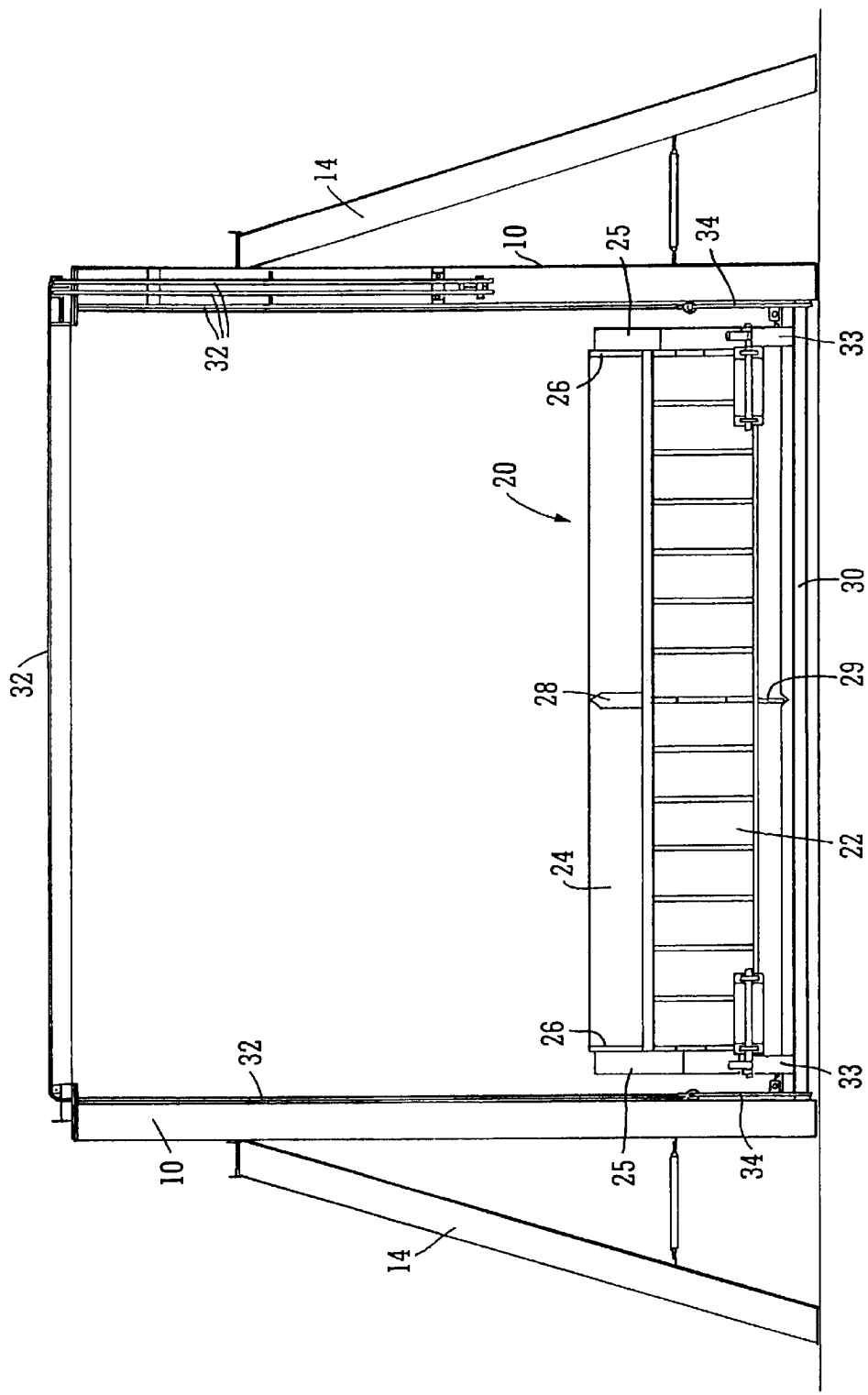
FIG. 1 is a front end view of a preferred embodiment of the composting cage of the invention, showing a feeder trough positioned at a low level filling station.
Figure 2:
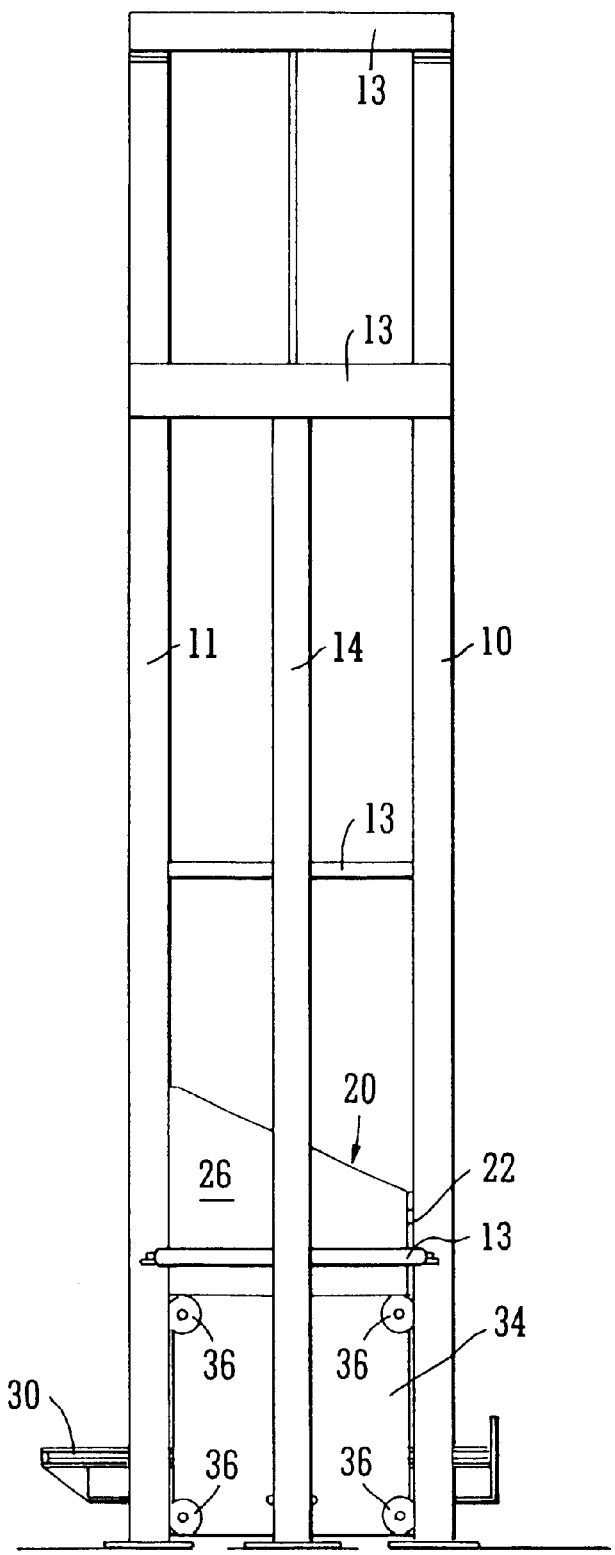
FIG. 2 is an enlarged scale side view of a front portion of the cage shown in FIG. 1 (i.e at the same end as in FIG. 1)

In FIGS. 1 and 2 the trough 20 is shown at its loading station at the front of the perforated enclosure 15 of the cage. It is arranged close to the ground on a platform 30 which is part of a hydraulic lift mechanism. In FIG. 1, a pair of lift cables 32 are shown, which are extensible by the action of a hydraulic ram 35 at the right hand side. The cables 32 extend adjacent the inside of respective beams 10 at the front of the trough 20. The cables 32 are attached to respective elevator plates 34 which are mounted between the upright beams 10, 11 by way of wheels 36. These wheels 36 are guided between the beams 10, 11 as the plates 34 are raised and lowered by the hydraulic cables 32. The plates 34 are connected to the platform 30 at each end so that the platform 30 and the trough 20 mounted on it are raised and lowered therewith.

Thus, in use, the trough 20 is filled at ground level by a mechanical shovel, or similar device, and it can be filled evenly and to an adequate level by inspection by the loading operator. The hydraulic lift 30, 34, 36 is then actuated and the trough 20 is raised to the top of the front of the cage. Here, a limit switch is actuated by the trough 20 to start up the motors 27 which drive its wheels 33, power for the motor being supplied via a cable reel. It then moves off the platform 30 and travels along rails provided at the top of the cage sides until it reaches the cage compartment for which its load is destined. This is preprogrammed by the operator from a central control unit. Upon reaching the correct compartment, the motors for the rotors 21 are actuated simultaneously with the motor 43 for the rotary cam 45 which releases the flaps 18 in the manner previously explained, by disengaging the latching bar 37 from the catch plate 41. The load is then dispensed evenly into the compartment. After a pre-set time period, the motors 27 are operated in reverse and the trough 20 then travels backwards towards the platform 30 at the front of the cage. As it does so, the striker part 49 of the linkage 29 in the flap release mechanism makes contact with an upward, stationary projection 59 (see FIG. 3) located substantially centrally of the support structure for the cage. This pushes back the linkage 29 causing the flaps 18 to close again. It also serves to pivot the last link 39 and push the latching bar 37 back through the partition 28 to re-engage the catch plate 41, so that the flaps 18 are kept closed.

Figure 9:
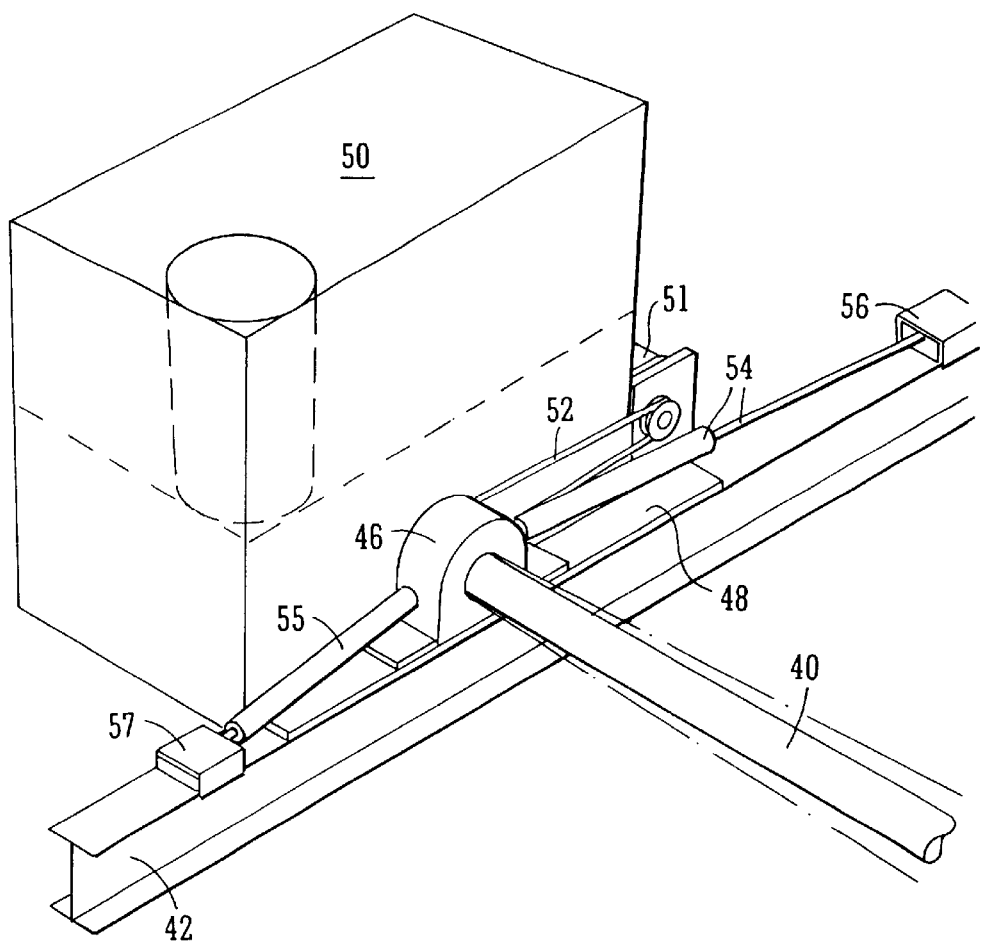
FIG. 9 is a fragmentary perspective view showing the mounting of one end of an auger to a guide rail in the same embodiment of cage as in FIG. 1.
Figure 10:
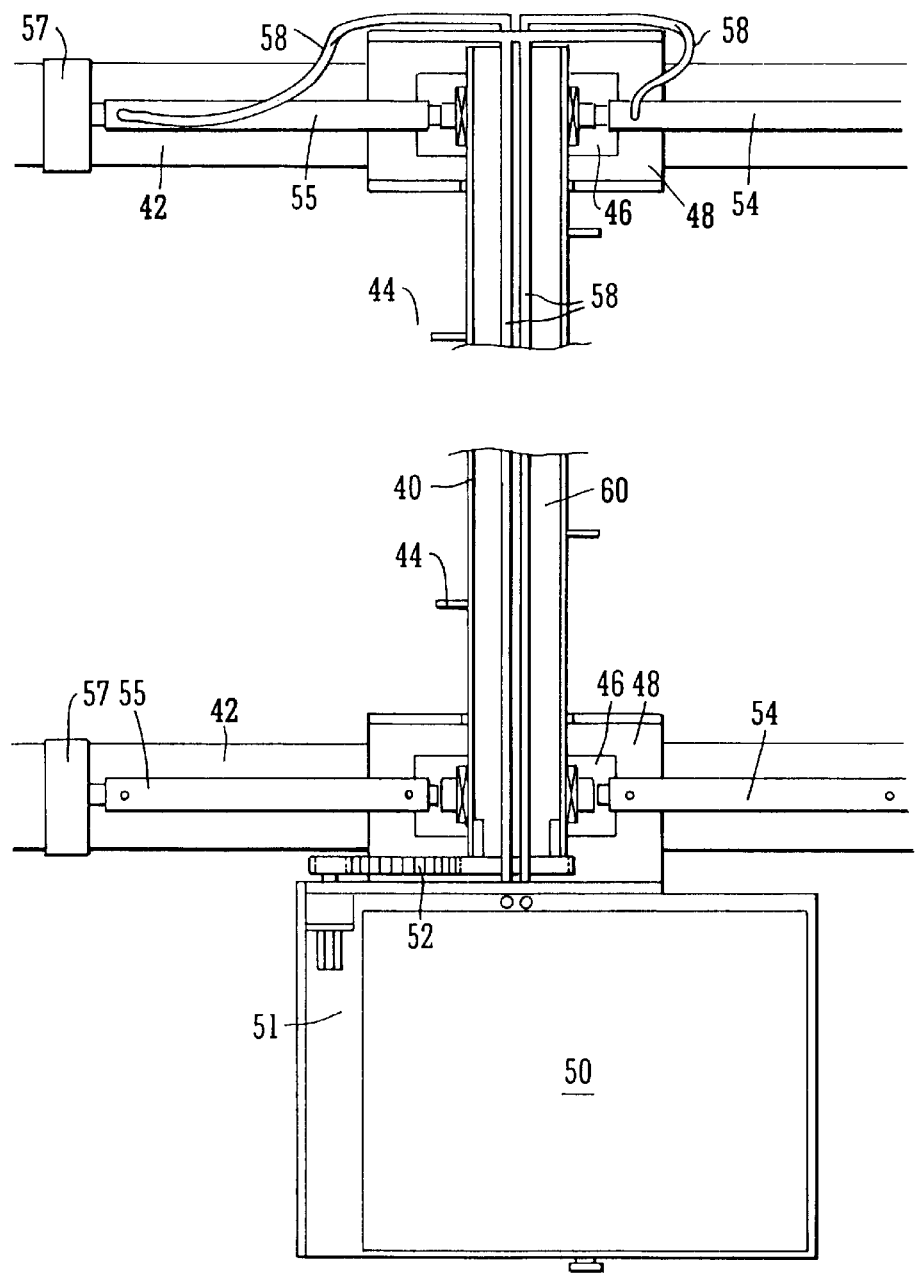
FIG. 10 is a broken, part-sectional plan view showing the mounting of both ends of the auger shown in FIG. 3.

Referring now to FIGS. 9 and 10, an auger 40 is mounted below the base of the mesh enclosure is. It extends between respective guide rails 42 provided by I-beams which are mounted below and outwardly of the longitudinal side walls of the cage. The axis of the auger 40 is tubular, as is apparent from FIG. 10. It has a helical contra-flight from the centre 44 which increases in pitch along its length, i.e. from the centre to each side of the cage. This is necessary to try and ensure an even removal of composted material across the width of the cage, the material being transported towards the end of the auger 40 with the larger diameter flight 44. At the extremity of the flight 44, a cross piece, or other conformation (not shown) is preferably provided to facilitate break up of the compost to enable its removal. In this respect it is fairly well compacted at the base of the cage where it may have been resident and undergoing aerobic degradation for up to 21 days.

Each end of the auger 40 is mounted, for rotation, in a respective bearing block 46, which is connected to a slide plate 48, which rests upon the respective rail 42. At one end, a power pack 50 for operation of the auger 40 is connected to the slide plate 48. A motor 51 and drive belt 52 for rotation of the auger are connected to the power pack 50.

Respective piston and cylinder assemblies 54, 55 extend in opposite directions from each bearing 46, the piston, in each case, carrying at its free end a gripper 56, 57 which is engagable with the respective rail 42. Each gripper 56, 57 has a pair of lugs or teeth or hooks (not shown) in its undersurface which selectively engage in corresponding pairs of apertures (not shown) which are formed at spaced intervals along each rail 42. The piston and cylinder assemblies 54, 55 at the opposing ends of the auger have a common hydraulic supply from the power pack 50. In this respect, pipes 58 for supply of hydraulic fluid to the assemblies 54, 55 remote from the power pack 50 extend through an axial space 60 in the auger 40 itself. Thus, the pairs of piston assemblies 54, 55 at each end of the auger 40 operate substantially in synchrony with each other so as to move the auger 40 along the rails 42 below the composting enclosure with the auger held substantially perpendicular to the direction of travel.

The auger 40 is moved intermittently by sequential operation of the forward and rearward assemblies 54, 55. Thus, if the auger 40 is considered to be at or near the front of the cage and moving towards the rear, then starting with the gripper 56 of each forward piston firmly locked to the rail 42 and the piston of each forward assembly 54 fully retracted, the gripper 57 of each rear piston will automatically be slightly tilted relative to the rail 42 so that its teeth (or lugs or hooks) disengage. The piston of each forward assembly 54 is then extended (FIG. 7), thus moving the bearings 46 and the auger 40 towards the rear. In this respect, the auger 40 moves quite slowly, maybe only about ½ M in a period of 2½ minutes. The pistons (rams) act with a constant force, e.g of 8 tonnes. Once the pistons of each forward assembly 54 are fully extended the grippers 56 attached to them will disengage from the rail 42 by retraction of the piston. The grippers 56 will then re-engage further rearward pairs of apertures in the respective rails 42 by re-extensions of the piston 54.

The auger (40) will always move down the full length of the cage, removing the bottom 1 ft (30 m) or thereabouts of compost, which is disgorged onto conveyors along both sides of the cage. The auger (40) needs to move the entire length so as to ensure substantially even removal and so as to maintain the momentum of breaking up the compacted lowest layer of composted material.

When moving in the other direction, back towards the front of the cage, it is the rearward piston and cylinder assemblies (55) which push the auger (40) intermittently along and the sequence of operation is the converse of that just described.

The foregoing description is illustrative not limitative of the scope of the invention and many variations in detail are possible. In particular, the perforated enclosure could be made of wire mesh instead of being of perforated sheet metal or plastics material.

What is claimed is:

1. In a composting cage comprising a perforated enclosure divided into a plurality of compartments, a trough for reception of material to be composted, and means enabling said trough to travel across the top of said enclosure to dispense the material to be composted into said compartments, the improvement wherein said trough has a base which includes a plurality of side by side rotors, each having circumferential vanes and radially extending cross walls whereby the material to be composted can be distributed to said compartments.

2. A composting cage as set forth in claim 1 wherein said trough has a plurality of flaps mounted below said rotors, these flaps being openable by a lever mechanism upon actuation of said rotors.

3. A composting cage as set forth in claim 2 wherein said flaps are closable by contact with projections from the top of said enclosure as said trough travels in reverse direction after dispensing its load of material to be composted.

4. A composting cage as set forth in claim 1 and further comprising a hydraulic lift which is operable to raise and lower said trough between a low level filling station and the top of said enclosure.

5. A composting cage as set forth in claim 1 wherein said trough is provided with wheels and a motor, whereby said trough is able to travel along tracks provided along the top of said enclosure.

6. A composting cage as set forth in claim 1 further comprising guide rails mounted below said enclosure, an auger, also mounted below said enclosure and between respective ones of said guide rails, and a coordinated system of hydraulic rams operative to move the auger intermittently along the respective guide rails to extract compost from the base of each said compartment.

7. A composting cage as set forth in claim 6 wherein respective hydraulic rams are arranged at each end of the auger, mounting the auger to the respective guide rails, and wherein the hydraulic rams have a common hydraulic power supply, which links to one of the rams through an axial passage in the auger.

8. A composting cage as set forth in claim 7 wherein gripper means connect the hydraulic rams to the respective guide rails and said gripper means selectively engage the rails at predetermined intervals.

9. A composting cage comprising a perforated enclosure divided into a plurality of compartments, guide rails mounted below said enclosure, an auger also mounted below said perforated enclosure between respective guide rails, and a co-ordinated system of hydraulic rams operative to move the auger intermittently along the respective guide rails to extract compost from the base of each said compartment.

10. A composting cage as set forth in claim 9 wherein the hydraulic rams are arranged at each end of the auger, mounting the auger to the respective guide rails, and wherein the hydraulic rams have a common hydraulic power supply, which links to one of the rams through the axis of the auger.

11. A composting cage as set forth in claim 10 wherein gripper means connect the hydraulic rams to the respective guide rails and said gripper means selectively engage the rails at predetermined intervals.

* * * * *